Feb. 6, 1973  L. O'NEAL  3,714,745
INFLATABLE DOCK SEAL
Filed Nov. 8, 1971
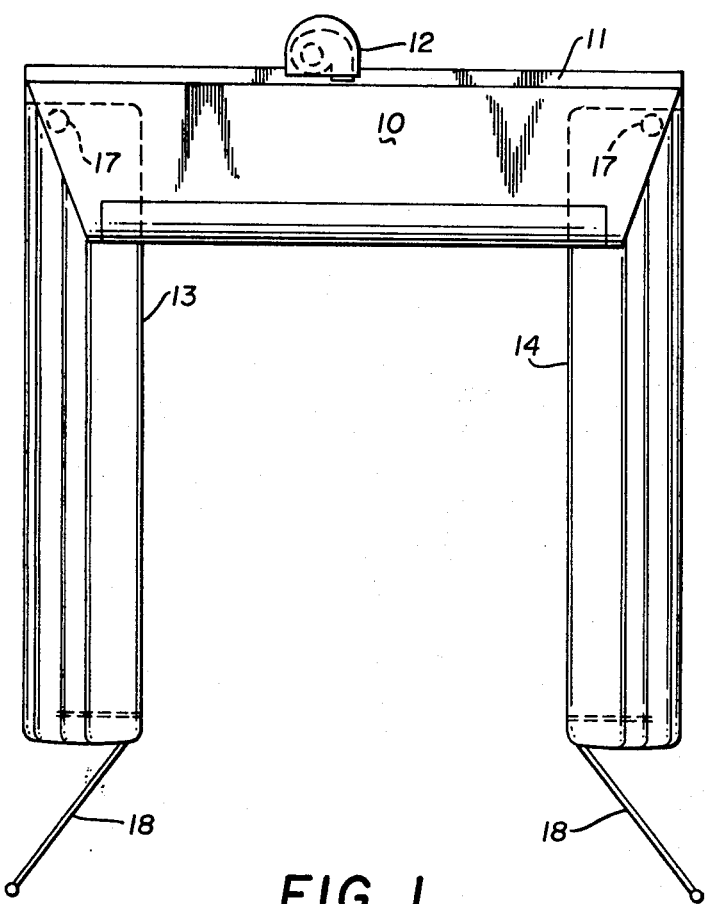
FIG. 1
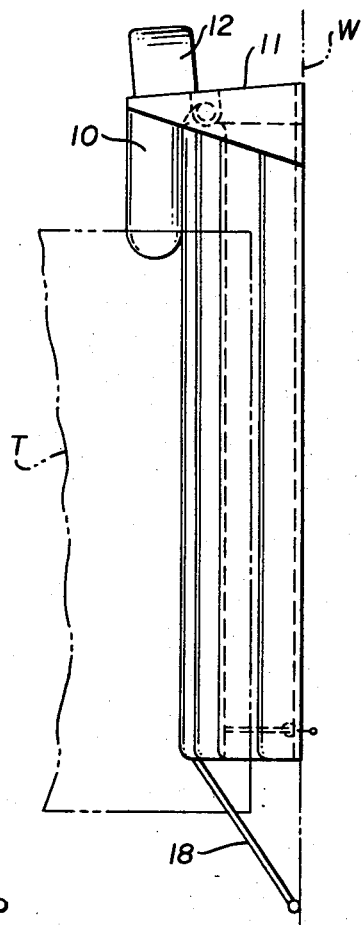
FIG. 2
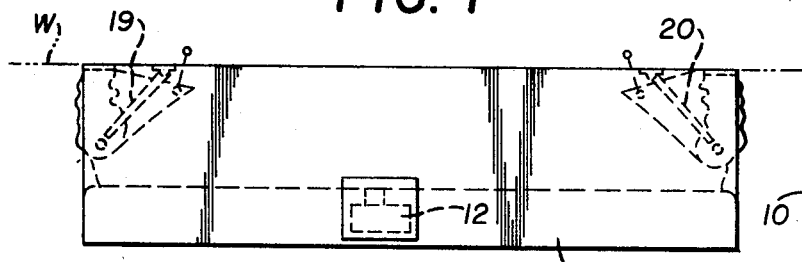
FIG. 3
FIG. 4
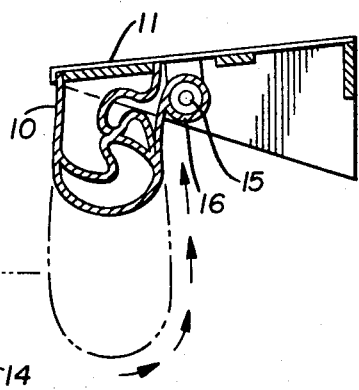
FIG. 5
INVENTOR.
LARRY O'NEAL
BY W. B. Harpman
ATTORNEY

United States Patent Office 3,714,745
Patented Feb. 6, 1973

3,714,745
INFLATABLE DOCK SEAL
Larry O'Neal, 4953 Timbercrest Drive,
Canfield, Ohio 44406
Filed Nov. 8, 1971, Ser. No. 196,471
Int. Cl. E06b 7/22
U.S. Cl. 52—2                                                  6 Claims

ABSTRACT OF THE DISCLOSURE

An inflatable dock seal for closing an opening such as a loading dock with respect to a truck or trailer includes an upper horizontal inflatable member movable downwardly against the top of the truck or trailer and a pair of vertical inflatable members movable outwardly in curving configurations to engage the sides of the truck or trailer. The horizontal and vertical inflatable members are closed with respect to one another at their junctions and the vertical inflatable members are arcuate in inflated configuration so as to move outwardly and toward one another restricting the opening in which the truck or trailer is positioned. The inflatable members are formed of waterproof fabric and means for inflating the same is provided and means for resiliently retracting the members when non inflated are also provided.

BACKGROUND OF THE INVENTION

(1) Field of the invention

This invention relates to inflatable dock seals for closing an opening in a building with respect to a truck or trailer positioned adjacent thereto.

(2) Description of the prior art

Prior structures of this type are usually mounted on or in an opening in a building against which a truck or a trailer is to be positioned and when inflated frequently extend into the passageway communicating with the truck or trailer and are subjected to damage. (See U.S. Pats. Nos. 2,634,589, 2,939,467, 3,303,615, 3,391,502 and 3,391,503.)

This invention locates the inflatable dock seal members above and to the sides of the building opening with which the truck or trailer body is to be registered and provides for the movement of the inflatable members toward the truck or trailer body so as to engage the top and the opposite sides thereof and thereby avoid interference in the opening in between the truck or trailer body and the opening in the building.

SUMMARY OF THE INVENTION

An inflatable dock seal comprises three inflatable members positioned around an opening in the building so as to seal a truck or trailer body with respect thereto. An upper horizontal inflatable member is arranged to move downwardly against the top of the truck or trailer so as to close any space between the opening in the building and the top of the truck or trailer body and joined vertically standing inflatable members spaced sidewardly from the opening in the building will when inflated move toward one another and assume an arcuate shape contacting the opposite sides of the truck or trailer body. Means is provided for retracting the inflatable members when deflated so as to move them away from the door opening and thus prevent damage of the same by a truck or trailer body backed thereinto which might otherwise occur.

DESCRIPTION OF THE DRAWING

FIG. 1 is a plan view of the inflatable dock seal showing the same in inflated position.

FIG. 2 is a side elevation of the dock seal seen in FIG. 1 with broken lines illustrating the rearmost portion of the truck or trailer body.

FIG. 3 is a top view showing the inflatable dock seal in deflated condition.

FIG. 4 is a top view showing the dock seal in inflated position with broken lines indicating the position of a truck or trailer body with respect thereto.

FIG. 5 is a vertical section through the top horizontal portion of the dock seal showing the same in retracted position and with broken lines indicating the same in inflated position.

DESCRIPTION OF THE PREFERRED EMBODIMENT

In the form chosen for illustration the inflatable dock seal comprises three inflatable sections arranged in an inverted U shape and positioned on the exterior of a building above and to the sides of an opening therein against which a truck or trailer is to be positioned. In FIGS. 1, 2, and 4 of the drawings the inflatable members are seen in inflated condition and by referring thereto it will be seen that an upper horizontal inflatable member 10 extends transversally across an opening and is attached to and supported by a frame 11. A motor driven blower 12 is positioned on the frame 11 and communicates with the inflatable member 10 and by way thereof with the upper ends of a pair of vertical inflatable members 13 and 14 respectively which are positioned on the opposite sides of the opening and are so formed as to assume an arcuate or curving shape when inflated.

In FIG. 2 of the drawing a broken line representation of a building wall W may be seen with the frame 11 secured thereto and the vertical inflatable members 13 and 14 also secured thereto.

In FIG. 2 of the drawing broken lines T indicate the position of the rearmost portion of a truck or trailer body which is positioned adjacent an opening in the wall of the building W around which the inflatable dock seal is positioned and it will be seen that the upper horizontal inflatable member 10 has moved downwardly when inflated so as to engage the uppermost portion of the truck or trailer body T.

By referring to FIG. 4 of the drawing it will be seen that the vertical inflatable members 13 and 14 have moved outwardly in an arcuate or curving shape so as to engage the opposite sides of the truck or trailer body T.

The upper horizontal inflatable member 10 is preferably formed in a manner similar to that shown in my Pat. 3,391,503 of July 9, 1968 in that a transverse rotatable shaft 15 is provided along with means for rotating it about which an extension 16 of the back wall of the upper horizontal inflatable member 10 may be wound. As best shown in FIG. 5 of the drawing the upper horizontal inflatable member 10 may be inflated to form a suitable closure with respect to the top of a truck or trailer body while it is in any one of a number of positions controlled by the degree of the engagement of the flap 16 about the rotatable shaft 15. The shaft 15 may obviously be rotated by any suitable means including manual means and motor driven means not shown.

In FIG. 1 of the drawing broken line representations of openings 17 may be seen to provide communication between the interior of the upper portion of the upper horizontal inflatable member 10 with the upper portions of the vertical inflatable members 13 and 14 respectively and those skilled in the art will observe that when blower 12 is actuated air enters the upper horizontal inflatable member 10 and expands it into sealing engagement with the top of the truck or trailer body T while at the same time entering the vertical inflatable member 13 and 14 and causing them to move into arcuate configuration where they extend toward one another and engage the opposite sides of the truck or trailer body T. At such time as it is desired to deflate the inflatable dock seal the blower 12 is stopped and air then vents from the upper horizontal inflatable member 10 and the vertical inflatable members 13 and 14 as the same are retracted by a plurality of elastic cords 18 such as are secured to the lower ends of the vertical inflatable members 13 and 14 and to the building wall W as seen in FIGS. 1 and 2 of the drawing and by referring to FIGS. 3 and 4 of the drawing it will be seen that spring urged arms 19 and 20 attached to the frame 11 and the uppermost portions of the vertical inflatable members 13 and 14 will both support the same when in non-inflated position and swing them outwardly and sidewardly and away from the truck or trailer body positioned therebetween and as illustrated in FIG. 3 of the drawing.

By referring to FIGS. 1 and 4 of the drawing it will be seen that the vertical inflatable members 13 and 14 are each formed of vertically standing elongated rectangular hollow flexible members which are in turn provided with space parallel longitudinally extending seams and apertured partitions vertically thereof so as to control the configuration thereof when inflated. The arrangement is such that the flexible members when secured along one of their vertical edges to the wall W of a building outwardly from an opening therein will when inflated assume an arcuate or curving shape as seen in FIGS. 1 and 4 of the drawing with the opposite longitudinal edge of each of the members moving outwardly and toward one another so as to engage the opposite sides of a truck or trailer body positioned therebetween.

The configuration thus formed while self supporting in inflated condition is held in desired vertical location by the spring urged support arms 19 and 20 heretofore referred to which swing out with the outward free edges of the inflatable members 13 and 14 and support them when they are deflated and at the same time swing them backwardly away from the opening in the building wall to which they are attached.

It will thus be seen that an inflatable dock seal has been disclosed which differs from the prior art construction in that it is spaced with respect to the opening about which it is positioned in a building wall so that it does not interfere with the clearance space in the opening which is essential in moving articles into and out of the truck or trailer body in registry therewith. In such spaced relation it does not intrude into the communicating passageway and is not subject to damage by lift trucks or the like moving into and out of the truck or trailer body as has heretofore been common. By the same token the arrangement of the inflatable dock seal around and about the outer sides of the opening prevents accidental damage of the same by a truck or trailer body backed thereinto and out of registry with said opening as will also occur to those skilled in the art.

Although but one embodiment of the present invention has been illustrated and described, it will be apparent to those skilled in the art that various changes and modifications may be made therein without departing from the spirit of the invention.

I claim:

1. An inflatable dock seal for positioning on a wall having an opening defined therein and comprising an inflatable inverted U shaped seal consisting of an upper horizontal inflatable member and a pair of vertical inflatable members in communication therewith, means positioned above said opening and supporting said upper inflatable member transversally thereacross in a plane generally outward from the plane of the wall, said vertical inflatable members each consisting of an elongated hollow flexible member having a transversally arcuate configuration and secured at their opposite outer longitudinal edges to said wall in spaced relation to said opening defined therein.

2. The inflatable dock seal of claim 1 and wherein each of said inflatable members has at least one apertured partition therein arranged to control the shape of said member when inflated.

3. The inflatable dock seal of claim 1 and wherein rigid members are positioned longitudinally of each of said inflatable members and form one wall thereof and serve as mounting means therefor with respect to said wall.

4. The inflatable dock seal of claim 1 and wherein the opposite ends of said upper horizontal inflatable members are tapered inwardly and downwardly so as to provide clearance for said vertical inflatable members and closure means is provided therebetween.

5. The inflatable dock seal of claim 1 including means for supporting said vertical inflatable members in inflated and deflated condition.

6. The inflatable dock seal of claim 1 including means for moving said inflatable members away from said opening.

References Cited

UNITED STATES PATENTS

| | | | |
|---|---|---|---|
| 3,391,502 | 7/1968 | O'Neal | 52—2 |
| 3,391,503 | 7/1968 | O'Neal | 52—2 |

JOHN E. MURTAGH, Primary Examiner

U.S. Cl. X.R.

52—173